(12) United States Patent
Niezur et al.

(10) Patent No.: US 8,998,688 B2
(45) Date of Patent: Apr. 7, 2015

(54) EXHAUSTER BAFFLE

(75) Inventors: Michael C. Niezur, Madison Heights, MI (US); Robert B. Davis, Macomb, MI (US)

(73) Assignee: Sika Technology AG, Baar (CH)

( * ) Notice: Subject to any disclaimer, the term of this patent is extended or adjusted under 35 U.S.C. 154(b) by 1666 days.

(21) Appl. No.: 11/923,146

(22) Filed: Oct. 24, 2007

(65) Prior Publication Data

US 2009/0111371 A1    Apr. 30, 2009

(51) Int. Cl.
*B60H 1/26* (2006.01)
*B62D 25/24* (2006.01)
*B62D 29/00* (2006.01)
*B60R 13/08* (2006.01)

(52) U.S. Cl.
CPC .............. *B62D 25/24* (2013.01); *B62D 29/002* (2013.01); *B60R 13/0884* (2013.01)

(58) Field of Classification Search
USPC .................. 454/162, 164; 296/187.02, 146.6; 264/46.6
See application file for complete search history.

(56) References Cited

U.S. PATENT DOCUMENTS

| | | | |
|---|---|---|---|
| 3,891,000 A | 6/1975 | Melnick | |
| 4,781,106 A * | 11/1988 | Frien | 454/164 |
| 4,972,765 A * | 11/1990 | Dixon | 454/164 |
| 5,105,849 A * | 4/1992 | Clough | 137/512.15 |
| 5,355,910 A | 10/1994 | Gies et al. | |
| 5,419,739 A | 5/1995 | Lewis | |
| 5,601,117 A | 2/1997 | Lewis et al. | |
| 5,759,097 A * | 6/1998 | Bernoville et al. | 454/162 |
| 5,904,618 A * | 5/1999 | Lewis | 454/162 |
| 6,135,543 A | 10/2000 | Esposito et al. | |
| 6,210,266 B1 | 4/2001 | Barton | |
| 6,273,127 B1 * | 8/2001 | Wade | 137/512.15 |
| 6,357,473 B1 | 3/2002 | Porter et al. | |
| 6,969,314 B2 * | 11/2005 | Misner | 454/164 |
| 7,044,164 B2 | 5/2006 | Carlson | |
| 7,503,843 B1 * | 3/2009 | Wilmoth | 454/162 |

FOREIGN PATENT DOCUMENTS

DE    102006014963    *    3/2006    ............ B60R 13/07

* cited by examiner

*Primary Examiner* — John Fox
(74) *Attorney, Agent, or Firm* — Harness, Dickey & Pierce, PLC

(57) ABSTRACT

An exhauster baffle is provided that may be used to prohibit fluid flow through a cavity except when a pressure on one side of the exhauster baffle is greater than a pressure on another side of the exhauster baffle. The exhauster baffle includes a body portion defining an opening, a sealer disposed on the body portion, and a flap disposed over the opening for regulating fluid flow through the opening. In one embodiment, the flap exposes the opening of the body portion to allow fluid to flow through the cavity when the pressure on one side of the exhauster baffle greater than the pressure on another side of the baffle to equalize pressure.

17 Claims, 3 Drawing Sheets

EXHAUSTER BAFFLE

BACKGROUND

1. Technical Field

The present disclosure relates to an exhauster baffle.

2. Description of the Related Art

Various commercial objects benefit from a rigid structural foundation while ideally remaining light-weight. In many circumstances, these objects are produced with frames that define internal cavities. For instance, the frame may be formed from a metal such as steel, and leaving a portion of the frame hollow (i.e., the cavity) reduces the weight of the frame. However, the cavity may foster an increase in sound and vibrations. A common approach to mitigating the added sound and vibrations within cavities includes sealing the cavity. Sealing also provides other added benefits. Thus, sealing the cavity is an important aspect of designing objects to be light-weight while still providing valued vibration dampening, and noise abatement. Such technology is often used with vehicles, including automobiles and airplanes, but may be used in other industries as well. Traditionally, a baffle is disposed across the cavity, and a sealer, such as a foam, expands to fill in space around the baffle, which prevents fluid flow through the cavity, ultimately resulting in decreased noise and vibrations.

Once sealed, no fluid may flow through the cavity. However, in some circumstances, it is desirable to allow fluid flow. For instance, it may be desirable to allow fluid to flow through the cavity to relieve pressure. By way of example, in automotive applications, it is generally important to seal the cavities in the frames of the vehicle. However, when slamming a door of the vehicle, pressure inside the vehicle builds and creates a pressure differential between the inside of the vehicle and the outside of the vehicle. Exhausters are typically placed about the vehicle to allow the pressure inside the vehicle to equalize relative to the pressure outside the vehicle. Having both baffles and exhausters in the vehicle adds to the weight and cost of the vehicle. However, if the baffle were able to prevent fluid flow in some circumstances while allowing fluid flow in other circumstances, the exhausters may be eliminated, reducing the weight and cost of the vehicle. Similar problems arise with baffles and exhausters in other industries.

Accordingly, a baffle is needed that can seal a cavity to mitigate vibration and noise while preventing fluid flow through the cavity in some circumstances and allowing fluid flow in other circumstances.

BRIEF DESCRIPTION OF THE DRAWINGS

The disclosure becomes better understood by reference to the following detailed description when considered in connection with the accompanying drawings, wherein.

DETAILED DESCRIPTION

An exhauster baffle is provided that prevents fluid flow through a cavity of, for instance, a vehicle while equalizing pressure between the inside of the vehicle and the outside of the vehicle. The exhauster baffle includes a body portion that extends across a cross-section of the cavity. The body portion defines an opening for allowing fluid flow through the cavity. A sealer is disposed on the body portion and expands to adhere the exhauster baffle to an inner surface of the cavity. A flap is disposed over the opening for regulating fluid flow through the cavity. The flap exposes the opening of the body portion to allow fluid to flow through the cavity when the pressure inside the vehicle is greater than the pressure outside the vehicle, effectively equalizing the pressure. Thus, the exhauster baffle regulates fluid flow through the cavity by acting as a one-way pressure and air exhauster fixed in a cross-section of the cavity.

Figure 1:
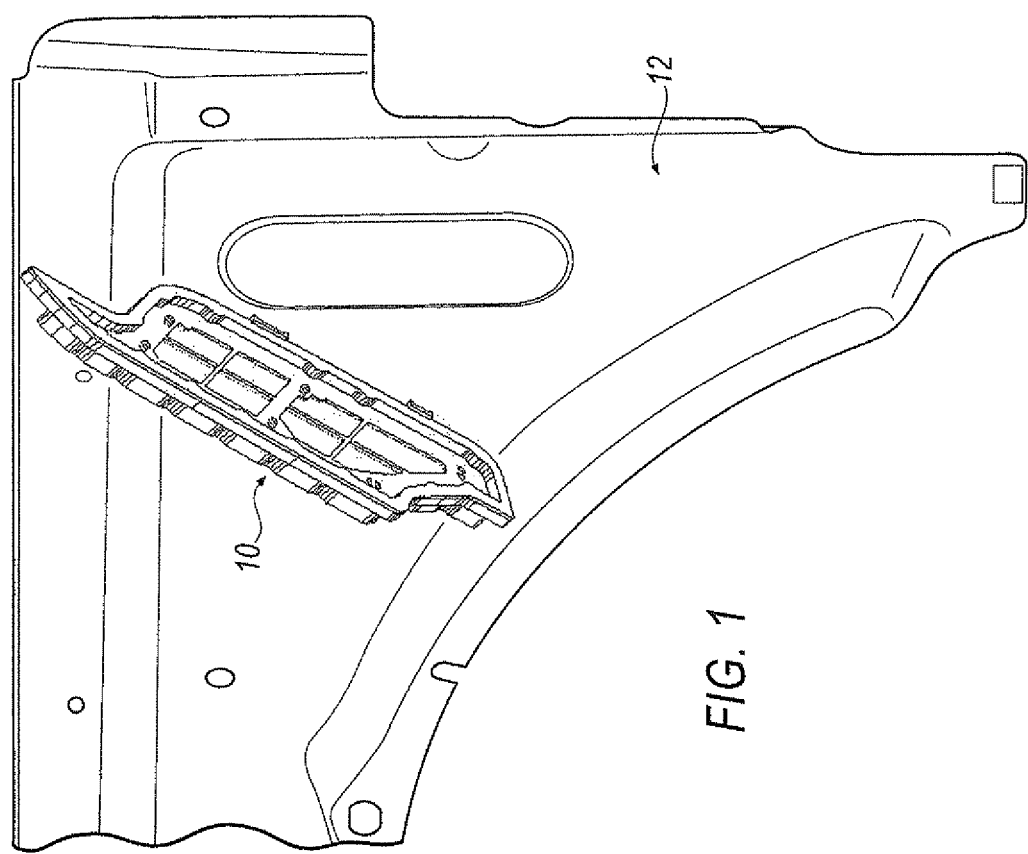
FIG. 1 is partial cross-sectional view of an exhauster baffle disposed in a cavity according to an embodiment.

Referring to the Figures, wherein like numerals indicate like or corresponding parts throughout the several views, an exhauster baffle is shown at numeral 10. FIG. 1 illustrates an exemplary embodiment of a partial cross-sectional side view of the exhauster baffle 10 disposed in a cavity 12 of a vehicle, although it is to be appreciated that the exhauster baffle 10 may be used in other applications. In automotive applications, the cavity 12 may be any cavity found in a vehicle. In one embodiment, the cavity 12 may be formed from a pillar (i.e., the A-pillar, the B-pillar, or the C-pillar) that extends between the body of the vehicle and the roof of the vehicle. In another embodiment, the cavity 12 may be formed from a fender of the vehicle. The cavity 12 may be defined by any portion of the vehicle, such as the frame, which may define any number of cavities, and any number of exhauster baffles may be disposed in any number of the cavities. It is to be understood that the cavity 12 may be defined by frames formed from any material, especially when used in other applications. However, regardless of the application, the cavity 12 has at least one inner surface, and the exhauster baffle 10 is typically disposed on the inner surfaces of the cavity 12. Specifically, the exhauster baffle 10 is adhered to the inner surfaces of the cavity 12 such that the exhauster baffle 10 extends across the cross-section of the cavity 12.

Figure 2:
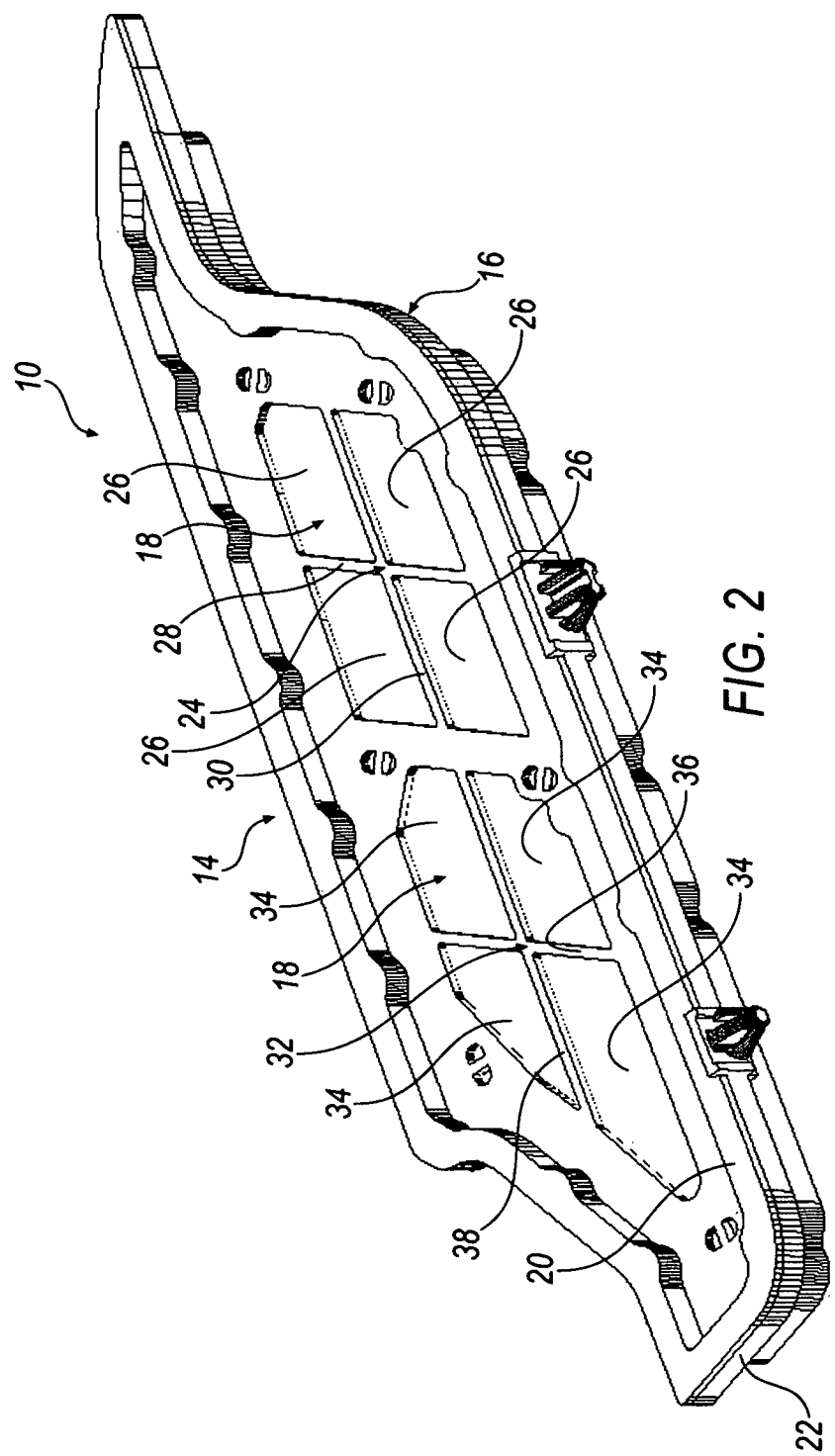
FIG. 2 is a perspective view of a first side of the exhauster baffle of FIG. 1 having a first rib structure and a second rib structure according to an embodiment.

FIG. 2 is a perspective view of a first side 14 of an exemplary embodiment of the exhauster baffle 10. The exhauster baffle 10 includes a body portion 16 defining an opening 18. Since the exhauster baffle 10 regulates fluid flow through the cavity 12 (FIG. 1), the body portion 16 may be formed having any shape to fit in the cavity 12. Specifically, the body portion 16 may be extruded in the cross-sectional shape of the cavity 12. Therefore, the shape and cross-sectional configuration of the body portion 16 may be dependent upon the cross-sectional configuration of the cavity 12. For instance, if the cavity 12 has a generally circular cross-sectional configuration, then the body portion 16 may have a generally circular shape. Alternatively, if the body portion 16 has a generally rectangular cross-sectional configuration, then the body portion 16 may have a generally rectangular shape. As illustrated, the body portion 16 has a shape that is configured to fit within the cavity 12 shown in FIG. 1. It is to be understood that the body portion 16 may have other cross-sectional configurations than described or illustrated herein.

A sealer 20 is disposed about a perimeter of the body portion 16 spaced from the opening 18. Specifically, the sealer 20 is disposed on a flange 22 that extends around the perimeter of the body portion 16. The sealer 20 adheres the exhauster baffle 10 to the inside surface of the cavity 12, which seals the cavity 12 and prevents fluid flow around the exhauster baffle 10. Although any type of sealer 20 may be used, the sealer 20 may be thermally expansible, meaning that the sealer 20 expands when exposed to a minimum threshold of heat. When expanded, the sealer 20 fills in spaces between edges of the body portion 16 and the inner surface of the cavity 12. In an automotive application, the sealer 20 may expand when the vehicle is exposed to heat from, for instance, a paint oven. Once expanded, the sealer 20 adheres to the inner surface of the cavity 12 and effectively seals the exhauster baffle 10 in the cavity 12. It is to be understood that different sources of heat may cause the sealer 20 to expand, and that the exhauster baffle 10 may be used in other applications besides automotive applications. The sealer 20 as illustrated in FIG. 2 has not been exposed to the heat source and is not expanded. It is to be appreciated that the exhauster baffle 10 may employ other types of sealers besides thermally expansible sealers.

The exhauster baffle 10 may further include at least one rib structure integrally formed with the body portion 16 and extending across the opening 18. It is to be appreciated that the exhauster baffle 10 may include any number of rib structures extending over any number of openings 18. As illustrated in FIG. 2, in one embodiment, the exhauster baffle 10 includes a first rib structure 24 extending over a first opening 26. The first rib structure 24 includes a first support 28 extending across the first opening 26. The rib structure further includes a second support 30 extending across the first opening 26 transverse to the first support 28. The second support 30 may extend perpendicular to the first support 28, although it is to be appreciated that the second support 30 may alternatively extend over the first opening 26 at other angles relative to the first support 28. Also, it is to be appreciated that the first support 28 and the second support 30 may be integrally formed with the body portion 16. Moreover, the second support 30 may be integrally formed with the first support 28. In another embodiment, the exhauster baffle 10 may further include a second rib structure 32 extending over a second opening 34. The second rib structure 32 has a third support 36 and a fourth support 38 extending across the second opening 34 perpendicular to the third support 36. Like the first rib structure 24, it is to be appreciated that the fourth support 38 may extend over the second opening 34 at other angles relative to the third support 36. Also, it is to be appreciated that the third support 36 and the fourth support 38 (i.e., the second rib structure 32) may be integrally formed with the body portion 16. In addition, the fourth support 38 may be integrally formed with the third support 36.

Figure 3:
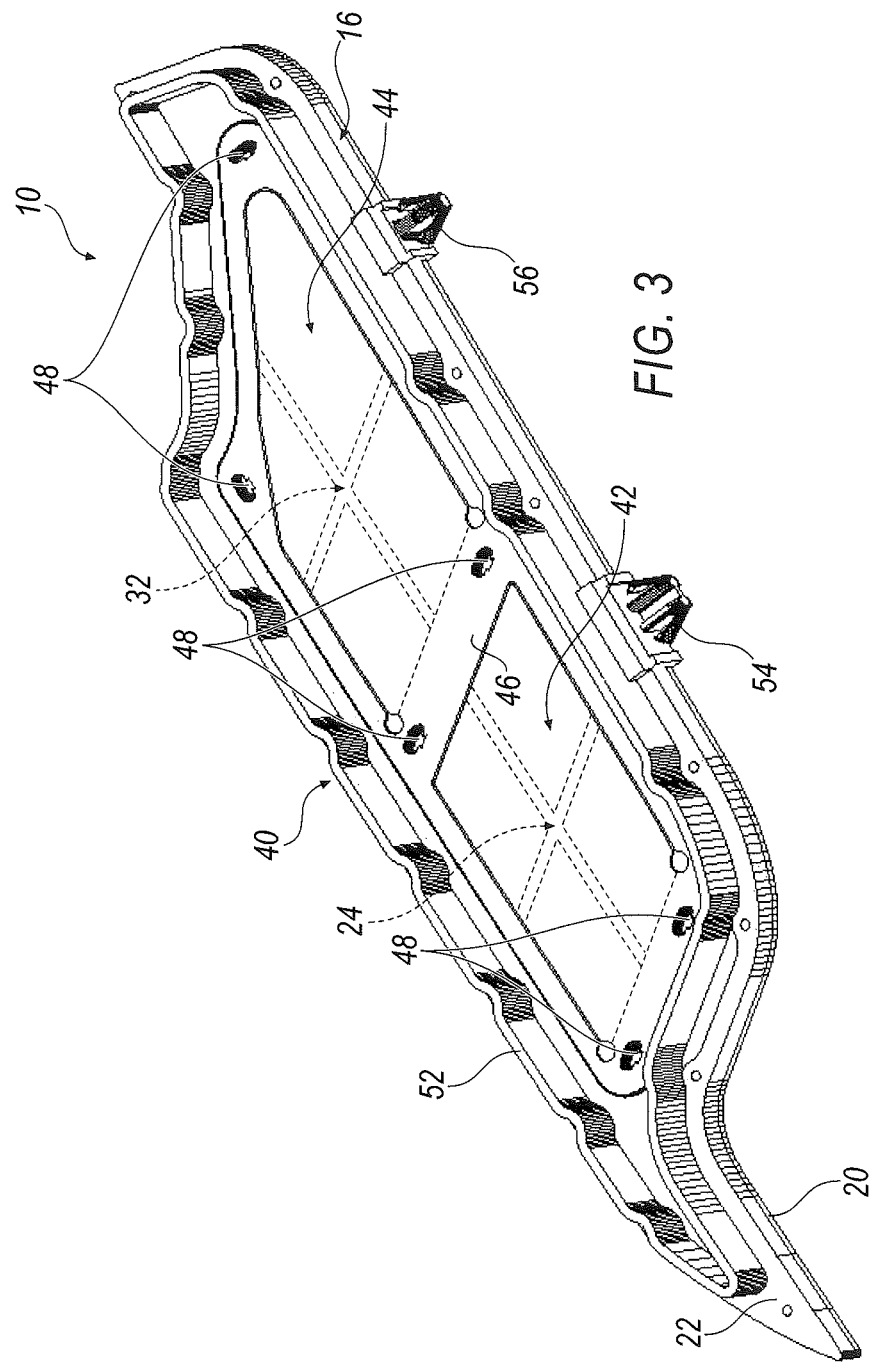
FIG. 3 is perspective view of a second side of the exhauster baffle of FIG. 1 having a first flap and a second flap according to an embodiment.

FIG. 3 is a perspective view of a second side 40 of an exemplary embodiment of the exhauster baffle 10. The exhauster baffle 10 includes at least one flap disposed on the body portion 16 and extending over the opening 18 for regulating fluid flow through the opening 18. It is to be appreciated that the exhauster baffle 10 may include any number of flaps or openings 18. As illustrated, the exhauster baffle 10 includes a first flap 42 extending over the first opening 26 and a second flap 44 extending over the second opening 34. In one embodiment, both the first flap 42 and the second flap 44 are integrally formed with a flap housing 46, which is disposed on the body portion 16. The flap housing 46 may be formed from a material, such as rubber, that is disposed on the body portion 16 over the openings 26, 34. It is to be appreciated that the flap housing 46 may be formed from other materials. In one embodiment, the flap housing 46 may define a plurality of holes and the body portion 16 may include a plurality of pins 48 integrally formed with the body portion 16 and extending through the plurality of holes of the flap housing 46 to ensure proper orientation of the flap housing 46 on the body portion 16, as well as hold the flap housing 46 onto the body portion 16. Alternatively, the flap housing 46 may held to the body portion 16 by riveting, heat staking, or any other fastening method. The flap housing 46 may define holes on either side of the first flap 42 and the second flap 44 to prevent tearing.

In another embodiment, the first flap 42 and the second flap 44 may be integrally formed with the body portion. In addition, the first rib structure 24 may be used to support the first flap 42, and the second rib structure 32 may be used to support the second flap 44. It is to be appreciated that the exhauster baffle 10 may include any number of flaps extending over any number openings 18 and being supported by any number of rib structures. The first flap 42 and the second flap 44 extend over the first opening 26 and the second opening 34, respectively, such that a fluid can only flow through the first opening 26 and the second opening 34 when a pressure on the first side 14 of the exhauster baffle 10 is greater than a pressure on the second side 40 of the exhauster baffle 10.

Gravity may hold the first flap 42 and the second flap 44 onto the rib structure to prevent fluid from flowing through the first opening 26 and the second opening 34. However, in some circumstances, the pressure on the first side 14 of the exhauster baffle 10 will be greater than the pressure on the second side 40 of the exhauster baffle 10. In order to equalize the pressure, the pressure on the first side 14 of the exhauster baffle 10 counteracts the force of gravity to move the first flap 42 to expose the first opening 26 and the second flap 44 to expose the second opening 34. In an automotive application, this may occur when a door of the vehicle is slammed. In that instance, the pressure inside the vehicle builds. When the pressure inside the vehicle becomes greater than the pressure outside the vehicle, the first flap 42 and the second flap 44 expose the first opening 26 and the second opening 34, respectively. As fluid flows through the first opening 26 and the second opening 34, the pressure inside the vehicle is equalized relative to the pressure outside the vehicle.

A wall 52 may be integrally formed with the second side 40 of the body portion 16 and extending perpendicular to the first flap 42 and the second flap 44. The wall 52 may be continuously disposed around the second side 40 of the body portion 16. The wall 52 prevents the sealer 20 from blocking the first flap 42 and the second flap 44 after the sealer 20 has expanded. Without the wall 52, the sealer 20 may expand over the first flap 42 or the second flap 44, which might prevent the first flap 42 or the second flap 44 from exposing the first opening 26 and the second opening 34, respectively. It is to be appreciated that the dimensions, location, and shape of the wall 52 may be dependent upon the shape of the body portion 16 and the thermal expansion properties of the sealer 20.

The exhauster baffle 10 may further include a first clip 54 integrally formed with the body portion 16 for mounting the exhauster baffle 10 in the cavity 12. The first clip 54 may have a first configuration that is keyed to fit in a specific hole defined by the inner surface of the cavity 12. Similarly, the exhauster baffle 10 may include a second clip 56 integrally formed with the body portion 16 for mounting the exhauster baffle 10 in the cavity 12. The second clip 56 may have a second configuration that is keyed to fit in a specific hole defined by the inner surface of the cavity 12. In one embodiment, the first configuration and second configuration are different than one another to ensure that the exhauster baffle 10 is properly oriented in the cavity 12. Orienting the exhauster baffle 10 improperly in the cavity 12 could prevent fluid from flowing in the desired direction. The first clip 54 may have a generally H-shaped configuration or any other configuration from a side view. On the other hand, the second clip 56 may have a generally t-shaped configuration or any other configuration from a side view. With the first clip 54 and the second clip 56 having different configurations, the first clip 54 cannot fit in the hole keyed for the second clip 56. Likewise, the second clip 56 cannot fit in the hole keyed for the first clip 54. The orientation of the exhauster baffle 10 in the cavity 12 depends on the desired direction of fluid flow through the cavity 12.

It is to be understood that the above description is intended to be illustrative and not restrictive. Many embodiments and applications other than the examples provided would be apparent to those skilled in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An assembly, comprising:
    a frame that defines an internal cavity; and
    an exhauster baffle extending across a cross-section of the internal cavity so as to divide the internal cavity into two portions, wherein the exhauster baffle comprises:
        a generally planar body portion defining an opening therethrough and having an integrally formed wall that is substantially perpendicular to the generally planar body portion and that surrounds the opening;
        a noise-reducing, thermally expansible sealer disposed on a perimeter of said body portion and configured to adhere said body portion to an internal surface of the structural frame; and
        a flap extending over said opening that is configured to open and close to regulate fluid flow through the opening;
        wherein the integrally formed wall prevents the sealer from coming into contact with the flap when the sealer expands.

2. An assembly as set forth in claim 1 wherein said body portion defines a flange spaced from said opening and wherein said sealer is disposed on said flange.

3. An assembly as set forth in claim 1 further comprising a rib structure integrally formed with said body portion and extending across said opening.

4. An assembly as set forth in claim 3 wherein said rib structure includes a first support extending across said opening and a second support extending across said opening transverse to said first support.

5. An assembly as set forth in claim 1 wherein said opening is further defined as a first opening and wherein said body portion defines a second opening spaced from said first opening.

6. An assembly as set forth in claim 5 wherein said flap is disposed over said first opening and said second opening.

7. An assembly as set forth in claim 5 wherein said flap is further defined as a flap housing having a first flap disposed over said first opening and a second flap disposed over said second opening.

8. An assembly as set forth in claim 5 further comprising a first rib structure integrally formed with said body portion and extending across said first opening.

9. An assembly as set forth in claim 8 wherein said first rib structure includes a first support extending across said first opening and a second support extending across said first opening transverse to said first support.

10. An assembly as set forth in claim 5 further comprising a second rib structure integrally formed with said body portion and extending across said second opening.

11. An assembly as set forth in claim 10 wherein said second rib structure further includes a third support extending across said second opening and a fourth support extending across said second opening transverse to said third support.

12. A vehicle comprising:
    a frame that defines an internal cavity; and
    an exhauster baffle extending across a cross-section of the internal cavity so as to divide the internal cavity into two portions, wherein the exhauster baffle comprises:
        a generally planar body portion defining an opening therethrough and having an integrally formed wall that is substantially perpendicular to the generally planar body portion and that surrounds the opening;
        a noise-reducing, thermally expansible sealer disposed on a perimeter of said body portion and configured to adhere said body portion to an external surface; and
        a flap extending over said opening that is configured to open and close to regulate fluid flow through said opening;
        wherein said integrally formed wall prevents said sealer from coming into contact with said flap when said sealer expands.

13. A vehicle as set forth in claim 12 wherein said exhauster baffle further includes a rib structure integrally formed with said body portion and extending across said opening.

14. The vehicle of claim 12, wherein the internal cavity is formed inside of a pillar that extends between the body of the vehicle and the roof of the vehicle.

15. The vehicle of claim 12, wherein the internal cavity is formed from a fender of the vehicle.

16. An assembly comprising:
    a frame that defines an internal cavity; and
    an exhauster baffle extending across a cross-section of the internal cavity so as to divide the internal cavity into two portions, wherein the exhauster baffle comprises:
        means for sealing a body portion to at least one inner surface of a cavity;
        means for regulating fluid flow through an opening in the body portion, wherein said means for regulating fluid flow is integrally formed with a flap housing disposed on the body portion; and
        means for preventing said sealing means from coming into contact with said fluid flow regulating means.

17. An exhauster baffle as set forth in claim 16 further comprising means for supporting said fluid regulating means over the opening, wherein said means for supporting said fluid regulating means are integrally formed with the body portion.

* * * * *